United States Patent [19]

Siadat

[11] 4,311,655
[45] Jan. 19, 1982

[54] INOMER THERMOFORMING

[75] Inventor: Bahram Siadat, Columbia, Md.

[73] Assignee: W. R. Grace & Co., New York, N.Y.

[21] Appl. No.: 135,912

[22] Filed: Mar. 31, 1980

[51] Int. Cl.$^3$ .......................... B29C 1/00; H05B 9/00; C08J 7/08
[52] U.S. Cl. ................... 264/22; 204/159.14; 204/159.2; 260/DIG. 21; 264/176 R; 264/299; 521/64; 528/503
[58] Field of Search ...................... 204/159.14, 159.11; 528/503; 260/DIG. 31; 264/25; 526/287, 274, 277, 317, 318

[56] References Cited

U.S. PATENT DOCUMENTS

| | | | |
|---|---|---|---|
| 2,617,752 | 11/1952 | von Hauteville | 260/29.5 |
| 2,966,469 | 12/1960 | Smythe | 521/918 |
| 3,338,739 | 8/1967 | Rees | 260/DIG. 31 |
| 3,454,676 | 7/1969 | Busse | 525/221 |
| 3,487,132 | 12/1969 | Thorne | 264/25 |
| 3,624,189 | 11/1971 | Goldman | 264/25 |
| 3,836,511 | 9/1974 | O'Farrell | 525/344 |
| 3,846,522 | 11/1974 | Goldman | 264/25 |
| 3,847,854 | 11/1974 | Canter | 260/23.7 M |
| 3,870,841 | 3/1975 | Makowski | 260/23.7 R |
| 3,966,672 | 6/1976 | Gaylord | 260/42.14 |
| 4,008,361 | 2/1977 | Park | 528/503 |
| 4,015,065 | 3/1977 | Park | 528/503 |
| 4,020,267 | 4/1977 | Park | 528/503 |
| 4,127,546 | 11/1978 | Lundberg | 260/27 BB |
| 4,131,587 | 12/1978 | Brenner | 260/32.6 A |
| 4,137,203 | 1/1979 | Makowski | 260/23.5 A |
| 4,145,379 | 3/1979 | Lundberg | 260/DIG. 31 |
| 4,147,677 | 4/1979 | Lundberg | 260/23.5 A |
| 4,160,751 | 7/1979 | Bock | 260/23.5 A |
| 4,163,117 | 7/1979 | Campbell | 264/25 X |
| 4,169,820 | 10/1979 | Bock | 260/23.5 A |

*Primary Examiner*—C. A. Henderson
*Attorney, Agent, or Firm*—Howard J. Troffkin

[57] ABSTRACT

A method of forming shaped articles from ionically cross-linked polymer compositions by subjecting an unshaped mass of said polymer composition to radio frequency energy of sufficient degree and time to cause dissociation of the ionically cross-linked regions while maintaining the mass at a temperature below the polymer degradation temperature and subjecting the polymer mass to sufficient shaping forces to form the polymer mass into desired shape.

14 Claims, No Drawings

INOMER THERMOFORMING

BACKGROUND OF THE INVENTION

Hydrocarbon polymers generally fall into two broad classes, thermoplastic and thermosetting resins. Thermoplastic resins may be readily worked by heating the polymer up to at least its softening point or melting point. They may then be processed by such conventional deformation methods as vacuum forming, extrusion of a melt, compression molding, etc.

The thermoset resins can generally not be reworked once they have hardened. In general, thermoset resins owe their unique properties to covalent cross-links between polymer molecules. The cross-links may be introduced by interaction of various monomers such as copolymerization of styrene in the presence of smaller amounts of divinyl benzene or the reaction of epoxy type resins with polyamines.

Uncured elastomers such as natural rubber and butyl rubber are thermoplastic. They may, however, be cross-linked or vulcanized by the use of sulfur and accelerators which react with the carbon of the unsaturated bonds in the polymer molecules to form, in effect, a thermoset product which can no longer be fabricated or worked except by machining or similar techniques. The characteristic property of a cross-linked polymer is its intractability above the softening point or melting point normally observed in the uncross-linked base polymer. Thus, whereas the uncross-linked polymer has a marked softening point or melting point above which the polymer is fluid and deformable, the cross-linked polymer retains its shape and will tend to return to that shape when deformed at all temperatures at which the polymer is stable. Once cross-linked the polymer is no longer fabricable, except possibly by machining. Cross-linked polymers have found wide utility because of the significant improvement in the physical properties obtained by cross-linking. Thus, rubber elasticity, impact resistance, flexibility, thermal stability and many other properties are either introduced or improved. The cross-linking of non-elastomeric polymers increases the toughness and abrasion resistance of the material. The intractability of thermosetting polymers limits the modes of processing the material into desired shapes.

A third class of polymers recently developed are ionically cross-linked polymers, generally referred to herein as "ionomers" or "ionomeric polymers". The cross-linking is accomplished by ionic bonding by way of association of ionic groups which are part of the polymer structure rather than by covalent bonding as is normal with thermoset polymers. The ionic aggregates therefore act as physical cross-links. These polymers exhibit the improved and desired properties normally related to thermoset polymers at normal operating temperatures while at elevated temperatures. The ionic aggregates dissociate allowing the ionomer to become deformable in the same manner as thermoplastic polymers. Unfortunately, in a majority of instances the ionic aggregates dissociate at temperatures close to or higher than the temperature at which decomposition occur in the ionomeric polymer composition and have, therefore, had limited usefulness.

The ionomeric polymers or ionomers may be readily prepared by a variety of techniques using numerous homo-, co-, and terpolymers as backbones. However, while all ionomers have several obvious advantages, one disadvantage to all is the increased difficulty in processability as compared to similar polymers having the same backbone but without ionomeric cross-linkages. It has been suggested that the processability can be improved by modification of the ionomer compositon. For example, U.S. Pat. No. 3,847,854 and U.S. Pat. No. 4,131,587 suggest that ionomers can be made readily workable by the addition of materials which preferentially plasticize the ionic cross-like regions to cause relaxation of the ionic bonds. Although these prior art mixtures are more readily processable, the final product either requires removal of the plasticizer to regain its desired properties or will have modified properties. Extraction is not always feasible nor complete and thus the final product does not exhibit the same properties as the neat starting ionomer.

U.S. Pat. No. 3,624,189 also discusses a mode of modifying polymer compositions to enhance its processability by the addition of a polar group containing modifying agent to the polymer composition. Such a blend presents a new composition which will exhibit characteristics attributable to the combination of the modifier and the polymer.

It is desired to provide a method of processing neat ionomers or ionomer containing compositions into shaped articles without modification of the polymer or the composition. Such articles would have to be capable of exhibiting the enhanced properties normally attributable to cross-linked ionomers.

SUMMARY OF THE INVENTION

The invention relates to a new and novel method of forming ionomeric polymers and compositions into shaped articles by subjecting a mass of the ionomeric polymer to radio frequency (Rf) energy of sufficient power and frequency and for a sufficient period of time to cause dissociation of the ionic bonds therein while maintaining the polymer mass at a temperature below its degradation temperature and subjecting the polymer mass to sufficient shaping forces to form the mass into a desired shape.

DETAILED DESCRIPTION OF THE INVENTION

The subject invention is directed to a new and novel method of causing ionically cross-linked polymers to be readily shaped into desired configurations using conventional shaping equipment while maintaining the polymer substantially below its temperature of degradation. Specifically, the subject invention is directed to selective internal heating of the ionic cross-linked groupings by subjecting the ionomer mass to sufficient radio frequency energy to cause dissociation of the cross-linked groupings therein. The dissociated cross-linked grouping containing polymer is subjected to shaping forces to form the desired configuration.

Electromagnetic heating devices which utilize radio frequency are conventionally available and have been known for more than a century. As early as 1900 electromagnetic devices were in practical use by doctors for treating parts of a patients body well below the skin surface. The technique was called diathermy. Industrial uses of such heating devices did not develop until World War II. More recently, devices of this type have been used when simple heating is required, such as in water removal from wood products, textiles and rubbers, as well as in the thawing of frozen foods and the like. Such devices have also been used to provide heat for chemical reactions, preheating of thermosetting compounds, curing vinyl and polyurethane foam as well as in setting resins impregnated in paper products. It can be readily seen that electromagnetic heating devices, including those utilizing radio frequency, are well known, readily available and adaptable to the present invention.

Radio frequency energy (also known as dielectric energy) found useful in performing the subject invention have a frequency range of from about 1 to 3000 megaHertz (mHz) and preferably from about 1 to 1000 mHz. The most preferable frequencies are in the range of from 1 to 200 mHz. The power required to generate sufficient energy to perform the subject invention should be at least about 0.5 kilowatts. The power of from about 0.5 to 200 kilowatts is generally sufficient with from about 0.5 to 100 kilowatts preferred for economy purposes. The effectiveness of the radio frequency energy capable of causing dissociation of the ionically cross-link groupings of the polymer is directly proportional to the increase in frequency and also directly proportional to the increase in power. Therefore, it can readily be seen that increase in frequency or power or both will shorten the time required to cause dissociation. Any power or radio frequency can be used for which a practical and suitable electrode system can be designed.

The unshaped polymer alone or as a component of a composition should be subjected to radio frequency energy for a time sufficient to cause dissociation of the ionic cross-link groups or aggregates contained in the polymer. The amount of time will normally be of short duration with times of from 10 seconds to 10 minutes being generally found sufficient. The time required will depend on the particular polymer composition, the amount of ionic cross-link groups therein and the degree of fluidity required to perform the particular mode of shaping. The exact amount of time necessary can be readily determined by conventional methods.

Certain known conventional heating systems, such as convection or conduction furnaces, open flame devices, infrared devices and the like heat solid substances from the surface inwardly. That is, there is a gradation of temperature with the higher temperature being at the surface of the substance. Because of this gradation, the temperature required to heat a substance as a whole to its processing temperature is higher than the processing temperature, per se. On the other hand, electromagnetic energy heating systems generally are used when all parts of the volume are desired to be heated simultaneously.

The present invention is directed to selective internal heating of an ionomeric polymer by using radio frequency energy. The subjecting of ionomers to radio frequency energy causes the ionic cross-link groupings to be selectively heated while heating the remainder of the ionomer to a lesser degree or not at all. In this manner the ionic cross-link groups are dissociated and permit the polymer to be formable without allowing the remainder of the ionomer being heated to a temperature which would cause degradation.

If it is desired to have the remainder of the polymer heated to further aid in forming a readily processable polymer mass one can supplement the radio frequency heating with conventional heating techniques. They can be used prior to, simultaneously with or subsequent to subjection of the ionomer to radio frequency energy. The particular sequence can be readily determined by one skilled in the art and will be dependent on the particular polymer structure, its physical and chemical properties and the particular shaping process being used.

There are no limits on the polymers which are useful in the instant invention as long as they contain ionic cross-link groups i.e. are ionomers. These ionomeric polymers are normally prepared by attaching carboxylic, sulfonic or phosphonic acid groups to the polymer such as by reacting a suitable polymer with an acid group producing reactant or by copolymerization of nonionic monomers with ionic group containing monomers.

The acid groups of the polymer are then neutralized with metal ions to ionically link the polymer. The metal ions are normally mono-, di- or trivalent ions of metals of Group I, II, III, IV-A and VIII of the Periodic Table of Chemical Elements. Suitable monovalent cations include sodium, potassium, ammonium, lithium, cesium, silver, mercury, and copper in its monovalent state. Divalent cations which are suitable include ions of berylium, magnesium, calcium, stronthium, barium cadmium, copper, mercury, tin, lead, iron, cobalt, nickel, zinc and the like. Suitable trivalent cations include aluminum, iron, and yttrium and the like. The preferred metals, regardless of the nature of the polymer composition, per se, are zinc and the alkali metals. These metal ions are found to form ionic cross-link groupings which most readily dissociate to impart melt fabricability and the desired improved solid state properties to the ionomeric polymer. More than one metal ion can be employed in the formation of the ionomeric polymers and combinations of metal ions may be preferred under certain applications.

Typical examples of ionomers which contain carboxylate groups therein as a salt in combination with a metal ion are those disclosed in British Pat. No. 1,011,981; U.S. Pat. Nos. 3,264,272; 3,322,734; 3,338,734; 3,355,319; 3,522,222; 3,522,223; and in Kobunshi Kagaku (High Polymer Chemistry), 25, No. 274, pages 107–115 (1968). Typical examples of ionomers employing phosphonylate-type pendant groups include those disclosed in U.S. Pat. Nos. 3,094,144; 2,764,563; Soviet Pat. No. 211,079, U.S. Pat. Nos. 3,097,194; 3,255,130, and by J. P. Schroeder and W. P. Sopchak in Journal of Polymer Science, 47, 417–433 (1960). Typical examples of ionomers employing sulfonate-type pendant groups include those disclosed in U.S. Pat. Nos. 2,714,605; 3,072,618; 3,205,285 and 3,836,511. Some of the above references disclose more than one of these three general categories of ionomeric polymers. All of the above references contained within this paragraph are incorporated herein by reference.

Polymers which exhibit both plastic and elastomeric properties, such as styrene-butadiene rubbers, butyl rubbers, ethylene-propylene-diene terpolymers and the like which have been sulfonated to convert them into ionomeric polymers are disclosed in U.S. Pat. No. 3,642,728. Polyethers which contain carboxylate, sulfonate or phosphonylate groups suitable for forming into metal salt ionomers are disclosed in U.S. Pat. No. 3,417,036. The teachings contained in these documents are incorporated herein by reference.

The above disclosure clearly indicates that various polymeric materials can be used, that the polymeric backbone has no practical restriction other than it containing or being capable of receiving an ionic group of carboxylate, sulfonate or phosphonylate which can be used to form ionomeric cross-linkages. The particular polymer backbone and ionic group will depend upon the particular end use of the polymer composition and can be readily determined by those skilled in this art.

The ionic acid groups of carboxylate, sulfonate and phosphonylate require, respectively, increasing dosage of radio frequency energy or power to cause dissociation. The particular acid group or combination will depend on the nature and strength of cross-linking desired. It is normally found that the ionic acid groups of carboxylate and sulfonate are preferred because of ease of preparation and processability according to the present invention.

The dissociation of ionic groups is dependent on the nature of ionic groups, the amount of ionic groups and the neutralizing entity associated with the ionic groups. Dissociation requires increasing energy as the nature of the ionic groups contained in the ionomer changes from carboxylate to sulfonate to phosphonylate and/or when the neutralizing entity is changed from a zinc or alkali metal ion to the other metal ions described above. To illustrate this, it has been found that only unmodified ionomers having low content of carboxylate groups therein which are in association with zinc or alkali metal ions can be processed using conventional heating devices. Unmodified sulfonate and phosphonylate containing ionomers are not processable by conventional techniques. The present invention permits processing of unmodified ionomers having any of the above described ionic groups and neutralizing entities. Even the zinc or alkali metal carboxylate containing ionomers can be more readily processed without degradation than if processed by conventional heating techniques.

The ionomeric polymers of use in the process of the subject invention should contain ionic groups, as described above, in sufficient amount to cause the polymer to exhibit the desired enhanced physical properties i.e. the minimum amount to permit formation of aggregated ionic regions in the material and of sufficient amount to have dissociation of the groups cause a marked increase in fabricability by molding, extrusion, and the like of the polymer. Normally ionic groups should be present in at least about 0.1 mole and preferably at least about 1 mole percent of the polymer. The ionic groups should not be present in amounts which make the polymer substantially water soluble. Such amount would vary depending on the nature of the polymer backbone and the particular ionic group or groups present. Normally, a satisfactory upper level of ionic group content should be less than about 30 mole percent of the total polymer.

Ionomers exhibit increased glass-transition temperature in linear relationship with respect to ionic group content of the polymer. Therefore, as the polymer has increased ionic group content and the desired solid state properties are attained one requires increased processing temperature conditions to cause, if at all possible, fluidization of the unshaped mass to permit ready fabrication. When conventional heating techniques are used, the required increased temperatures tend to cause degradation of the polymer system. The present invention has been found to cause selective heating and dissociation of the ionic cross-link groups while maintaining the polymer mass (normally in its unshaped or preworked shape) below temperature which would cause and/or permit degradation.

The polymer mass can be formed into a composition suitable for forming into desired shaped articles. The polymer mass may be combined with conventional additives such as dyes, pigments, fillers, modifier, plasticizers, oils and the like. These materials would, generally, not have specific affects on the ionic groups of the polymer but would be those additives used generally to modify the polymer mass as a whole to attain desired end products.

The ionomeric polymer mass can further contain a small amount of from about 0.5 to 5 wt. percent of a polar liquid such as water, alcohols and the like to further enhance the processing of the subject material. Normally, the processing time of such polar liquid containing polymers of the subject invention are decreased by twenty five percent or more. The polar liquid is substantially evaporated during the Rf treatment of the polymer and does not act as a plasticizer or modifier of the same.

When it is desired to produce a porous shaped product the untreated ionomeric polymer mass can be mixed with minor amounts of a volatile, polar liquid. Amounts of from about 0.5 to 10 wt. percent based on the weight of the total unprocessed polymeric composition will accomplish this result although less or greater amounts can be used if desired. Such volatile liquids should have a boiling point of up to about 100° C. and may be, for example, water, a $C_1$ to $C_3$ alkyl alcohols, aldehydes, ketones such as acetone and the like. The volatile polar liquid is generally removed from the polymer mass by standard techniques although residual amounts may remain in the resultant product.

The ionomeric polymer may be premixed with any other desired constituents such as by dry mixing or blending the solid polymer with other solid and/or liquid materials to facilitate forming a substantially uniform unshaped polymer composition suitable for forming the desired shaped article. The premixing procedure can be aided, where deemed feasible, by subjecting the mixture to radio frequency energy to cause fluidization of the polymer. The components or the premixed composition is subjected to radio frequency energy of a frequency, power and time sufficient to cause dissociation of the ionic cross-link groups therein while maintaining the polymer at a temperature below its degradation temperature. The radio frequency heating can be supplemented with conventional heating such as obtained by conduction or convection devices. The unshaped ionomeric polymer containing composition is subjected to shaping forces to form the composition into desired configuration while the polymer mass is suitably fluid i.e. its ionic cross-linked groups are in dissociated state. The shaping force can be any conventional shaping force such as obtained by extrusion, compression molding, vacuum forming and the like.

The polymeric composition having been formed into its desired shape is allowed to cool sufficiently, normally to ambient temperature, to again attain a polymeric material having the enhanced properties normally associated with cross-linked thermoset materials.

The following examples are given for illustrative purposes only and are not meant to limit the subject invention except as defined by the appended claims. All parts and percentages are by weight except where otherwise indicated.

EXAMPLE I

Granules of a commercially available ethylene-methacrylic acid copolymer having about 15 mole percent carboxylate groups therein which are neutralized with sodium and have a melt index of 1 dg/min. were charged into a silicone rubber mold. The granules were exposed to radio frequency (Rf) energy at broad band of 80 to 100 megaHertz at 0.5 kilowatt power. The Rf current was initially recorded to be 250 milliamps and gradually rose to 300 milliamps within one minute. At approximately 2 minutes residence time the current rapidly increased to 500 milliamps. The ionomer because soft and fluid. The mold and ionomer were subjected to pressure of about 10 psi for a period of 2 minutes. The resultant product was a solid object which had the configuration of the mold. The product was a one piece fused object which did not exhibit any signs of degradation such as by discoloration or gaseous discharge.

EXAMPLE II

The procedure of Example I was repeated except that the granular starting material was exposed to 100 percent humidity at 50° C. for a period of two days. The material was subjected to Rf energy as above. The maximum energy absorption was attained in 1.5 minutes and molding was completed in 3 minutes from start. The product was completely fused, solid unitary object having the configuration of the mold. No degradation was observed.

An additional sample was prepared as above except that the mold was an open configuration. A foamed material was obtained.

EXAMPLE III

A commercially available dry granular ionomer composed of a high molecular weight zinc salt of the copolymer of ethylene-methacrylic acid having about 15 mole percent MAA (Surlyn 1855 of DuPont) and a melt index of 1 dg/min. was charged into a mold and subjected to Rf energy at broad band of 80 to 100 mHz and 9 kilowatts. The Rf current was initially recorded to be 1.0 amp and generally rose to 1.1 amps after 45 seconds. The fused product was formed within 3 minutes. The fusion of the granules without application of external heat was indicative of softening of the ionic domains and then softening of the bulk of the polymer by internal conductive heating. The resultant product was a solid, unitary product which did not exhibit signs of degradation such as by discoloration or gaseous discharge. The resultant product had high tensile strength and modulus of elasticity as would be expected of cross-linked material.

The process was repeated except that the charged graules were initially exposed to 100 percent humidity at 50° C. for two days. The fused product was formed in less than 1.5 minutes and was similar to that made above.

EXAMPLE IV

The procedure of Example III was repeated except that the starting zinc carboxylate ionomer had a melt index of 10 dg/min. (Surlyn 1555). The material was subjected to Rf energy. A fused product was formed in about 5 minutes. The product did not show signs of degradation.

EXAMPLE V

A commercially available sulfonate containing ionomer composed of a 3 percent sulfonated ethylene-propylene-nonbornadiene (EPDM) rubber crumb (66.7 mole percent ethylene: 32.4 mole percent propylene: 0.9 mole percent norbornadiene) as the zinc salt was charged into a silicone rubber mold and subjected to 100 mHz Rf energy and 9.0 kilowatts for a 6 minute period. The Rf current was modulated and kept constant at 0.8 amps. The mold was maintained at a pressure of 15 psi. A solid cohesive product was obtained which had the shape of the mold. The product did not exhibit signs of degradation such as discoloration or emission of gases. The product exhibited high tensile strength and modulus of elasticity.

In comparison, a sample of the same sulfonate containing ionomer was charged into a flat plate mold. The sample was subjected 204° C. and 8000 pound ram force (4" dia. ram) for a period of 2 minutes. The material had not completely fused into a unified product. The material had darkened. Further, for comparative purposes, attempts were made to form a shaped article from the same sulfonate containing ionomer by conventional extrusion techniques. In Run 1, the material was charged into a ¾ inch single screw extruder equipped with a circular die for forming rod shaped articles. When using the parameters of; barrel temperature of 150° C., shear rate 15 RPM, die pressure of 1000 psi and torque of 800 m/gm, no solid product was obtained. The material remained in the form of crumb. In Run 2, the parameters were altered to 200° C. as barrel temperature; 15 RPM as shear rate; 1000 psi die pressure; and 1500 m/gm as torque, a product was formed which was dark brown-black in color, gave off noxious gases and was still not a completely cohesive, unitary product. Finally, in Run 3, the same sulfonate containing ionomer was mixed with 20 percent of zinc stearate as plasticizer. The parameters used were 180° C. as barrel temperature, 1600 m/gm torque, 1000 psi die pressure and shear rate of about 16 RPM. The product was a unitary, fused product, but was highly degraded as shown by dark brown coloration and noxious odor.

EXAMPLE VI

A ¾ inch single screw extruder is equipped with a radio frequency energizer capable of emitting 100 mHz at 9 Kw to the charged material. A sulfonate containing ionomer as described in Example V above is charged into the extruder under parameters which are substantially the same as used in comparative Run 1 of Example V above. A solid rod is obtained as a cohesive unitary product not exhibiting signs of degradation.

While the invention has been described in connection with certain preferred embodiments, it is not intended to limit the invention to the particular forms set forth, but, on the contrary, it is intended to cover such alternatives, modifications and equivalents as defined by the appended claims.

We claim:

1. A method of imparting processability to an ionically cross-linked polymer comprising subjecting a water insoluble, ionically cross-linked polymer mass having at least about 0.1 mole percent metal-ionic groups therein to radio frequency energy of sufficient frequency, power and time to cause dissociation among the ionic cross-link groups contained therein while maintaining the polymer mass at a temperature below its degradation temperature.

2. A method of shaping ionically cross-linked polymer material comprising subjecting an unshaped mass of a water insoluble, ionically cross-linked mass having at least 0.1 mole percent of metal-ionic groups therein to radio frequency energy of sufficient frequency, power and time to cause dissociation among the ionic cross-link groups contained therein while maintaining the polymer mass at a temperature below its degradation temperature and subjecting the polymer mass to shaping forces to form the polymer mass into a desired configuration.

3. The process according to claim 1 or 2 wherein the radio frequency energy has a frequency of from about 1 to 3000 megaHertz and the power is of at least about 0.5 kilowatts.

4. The method according to claim 3 wherein the ionically cross-linked polymer is a polymer selected from the group consisting of polyalkylenes, polydienes, polystyrene and copolymers thereof having at least about 1 mole percent of the polymer of ionic groups selected from carboxylate, sulfonate and phosphonylate which are in association with an ionically stabilizing moiety.

5. The method according to claim 3 wherein the ionic group is carboxylate and the stabilizing moiety is metal ions selected from the group consisting of: $Na^+$, $K^+$, $Li^+$, $Cs^+$, $Cu^+$, $Be^{++}$, $Mg^{++}$, $Ca^{++}$, $Sr^{++}$, $Ba^{++}$, $Cu^{++}$, $Cd^{++}$, $Hg^{++}$, $Su^{++}$, $Ph^{++}$, $Fe^{++}$, $Co^{++}$, $Ni^{++}$, $Zn^{++}$, $Al^{+++}$, $Sc^{+++}$, $Fe^{+++}$ and $Y^{+++}$.

6. The method according to claim 3 wherein the ionic group is sulfonate and the stabilizing moiety is metal ions selected from the group consisting of: $Na^+$, $K^+$, $Li^+$, $Cs^+$, $Cu^+$, $Be^{++}$, $Mg^{++}$, $Ca^{++}$, $Sr^{++}$, $Ba^{++}$, $Cu^{++}$, $Cd^{++}$, $Hg^{++}$, $Su^{++}$, $Ph^{++}$, $Fe^{++}$, $Co^{++}$, $Ni^{++}$, $Zn^{++}$, $Al^{+++}$, $Sc^{+++}$, $Fe^{+++}$ and $Y^{+++}$.

7. The method according to claim 3 wherein the ionic group is phosphonylate and the stabilizing moiety is metal ions selected from the group consisting of: $Na^+$, $K^+$, $Li^+$, $Cs^+$, $Cu^+$, $Be^{++}$, $Mg^{++}$, $Ca^{++}$, $Sr^{++}$, $Ba^{++}$, $Cu^{++}$, $Cd^{++}$, $Hg^{++}$, $Su^{++}$, $Ph^{++}$, $Fe^{++}$, $Co^{++}$, $Ni^{++}$, $Zn^{++}$, $Al^{+++}$, $Sc^{+++}$, $Fe^{+++}$ and $Y^{+++}$.

8. The process according to claim 3 wherein the unshaped polymer mass is substantially uniformly mixed with from 0.5 to 10 percent by weight based on the weight of the polymer of a volatile polar liquid having a boiling point of less than about 100° C. prior to treatment with Rf energy.

9. The method of claim 4 wherein the ionomeric polymer mass is subjected to a combination of radio frequency energy and conventional heating.

10. The method according to claim 4 wherein the Rf energy has a frequency of from about 1 to 1000 mHz.

11. The method according to claim 1 wherein the power of the Rf energy is from about 0.5 to 100 kilowatts.

12. The process of claim 5 wherein the metal ion is selected from the group consisting of sodium, potassium, magnesium, calcium and zinc.

13. The process of claim 6 wherein the metal ion is selected from the group consisting of sodium, potassium, magnesium, calcium and zinc.

14. The process of claim 7 wherein the metal ion is selected from the group consisting of sodium, potassium, magnesium, calcium and zinc.

* * * * *

UNITED STATES PATENT AND TRADEMARK OFFICE
CERTIFICATE OF CORRECTION

PATENT NO. : 4,311,655
DATED : January 19, 1982
INVENTOR(S) : Bahram Siadat

It is certified that error appears in the above-identified patent and that said Letters Patent are hereby corrected as shown below:

On the cover page

In the title (Item 54) change the word "Inomer" to -- Ionomer --.

Signed and Sealed this

Twenty-fifth Day of May 1982

[SEAL]

Attest:

Attesting Officer

GERALD J. MOSSINGHOFF

Commissioner of Patents and Trademarks